(12) United States Patent
Ooki et al.

(10) Patent No.: US 10,371,107 B2
(45) Date of Patent: Aug. 6, 2019

(54) AIR INTAKE DEVICE FOR INTERNAL COMBUSTION ENGINE

(71) Applicant: NISSAN MOTOR CO., LTD., Yokohama-shi, Kanagawa (JP)

(72) Inventors: Osamu Ooki, Kanagawa (JP); Kazuki Iijima, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/775,514

(22) PCT Filed: Nov. 19, 2015

(86) PCT No.: PCT/JP2015/082485
§ 371 (c)(1),
(2) Date: May 11, 2018

(87) PCT Pub. No.: WO2017/085823
PCT Pub. Date: May 26, 2017

(65) Prior Publication Data
US 2018/0347522 A1 Dec. 6, 2018

(51) Int. Cl.
*F02M 35/10* (2006.01)
*F02M 35/104* (2006.01)
(Continued)

(52) U.S. Cl.
CPC ....... *F02M 35/10255* (2013.01); *F02B 31/06* (2013.01); *F02D 9/10* (2013.01);
(Continued)

(58) Field of Classification Search
CPC ....... F02M 35/10255; F02M 35/10354; F02M 35/10268; F02M 35/10262; F02M 35/10;
(Continued)

(56) References Cited

U.S. PATENT DOCUMENTS 5,245,955 A * 9/1993 Husted ................ B29C 37/0082
123/184.61
5,273,014 A 12/1993 Mitobe et al.
(Continued)

FOREIGN PATENT DOCUMENTS

EP 2 772 623 A1 9/2014
JP 4-365969 A 12/1992
(Continued)

*Primary Examiner* — Marguerite J Mcmahon
(74) *Attorney, Agent, or Firm* — Foley & Lardner LLP

(57) ABSTRACT

An air intake device for an internal combustion engine of the present invention includes a water discharge passage extending from a bottom surface of a control valve housing part recessed in a housing passage forming part of an air intake passage to an air intake port. The water discharge passage is formed independently from the air intake passage, and includes: a water collection groove recessed in the bottom surface; a water discharge hole formed penetrating a cover of a valve control housing; and a water discharge hole penetrating a flange part of an insert inserted into the air intake port. The downstream end of the water discharge hole is connected to a space defined between an air intake port inner wall surface and an insert cylindrical part.

4 Claims, 6 Drawing Sheets

(51) Int. Cl.
*F02F 1/42* (2006.01)
*F02B 31/06* (2006.01)
*F02D 9/10* (2006.01)
*F16K 27/02* (2006.01)
*F16K 27/06* (2006.01)
*F16K 27/00* (2006.01)

(52) U.S. Cl.
CPC ........... *F02F 1/4257* (2013.01); *F02M 35/10* (2013.01); *F02M 35/104* (2013.01); *F02M 35/10085* (2013.01); *F02M 35/10262* (2013.01); *F02M 35/10268* (2013.01); *F02M 35/10321* (2013.01); *F02M 35/10354* (2013.01); *F16K 27/003* (2013.01); *F16K 27/0227* (2013.01); *F16K 27/065* (2013.01); *F02D 9/103* (2013.01); *F02D 9/1095* (2013.01); *Y02T 10/146* (2013.01)

(58) Field of Classification Search
CPC ... F02M 35/104; F16K 27/003; F16K 27/065; F16K 27/0227; F02D 9/10; F02D 9/103; F02F 1/4257; F02B 31/06
USPC ........................................ 123/184.21–184.61
See application file for complete search history.

(56) References Cited

U.S. PATENT DOCUMENTS

| | | | |
|---|---|---|---|
| 6,026,774 A * | 2/2000 | Kajihara | F02F 11/00 123/184.21 |
| 7,051,702 B2 * | 5/2006 | Sakai | F02B 23/08 123/188.14 |
| 10,190,546 B2 * | 1/2019 | Yoshioka | F02M 35/10222 |
| 2010/0251987 A1 * | 10/2010 | Sano | F02B 31/06 123/184.56 |
| 2011/0239975 A1 * | 10/2011 | Takeda | F02B 31/06 123/184.56 |
| 2014/0238330 A1 | 8/2014 | Matsuzaki et al. | |
| 2018/0215081 A1 * | 8/2018 | Arima | B29C 45/435 |

FOREIGN PATENT DOCUMENTS

| | | |
|---|---|---|
| JP | 2007-056794 A | 3/2007 |
| JP | 2008-248861 A | 10/2008 |
| JP | 2009-52491 A | 3/2009 |
| JP | 2014-227870 A | 12/2014 |
| JP | 2015-140699 A | 8/2015 |

* cited by examiner

US 10,371,107 B2

AIR INTAKE DEVICE FOR INTERNAL COMBUSTION ENGINE

TECHNICAL FIELD

The present invention relates to an air intake device for an internal combustion engine.

BACKGROUND TECHNOLOGY

An air intake device has been known in which gas flow is formed in a combustion chamber of an internal combustion engine by controlling the opening area of an air intake passage of an intake manifold. This type of the air intake device has been used in cold districts, and measures to discharge moisture content from around a control valve has been taken so as to suppress that moisture content in intake air flowing to the air intake device adheres to a rotation shaft of the control valve and it is frozen.

For example, in a patent document 1, a water collection groove is provided on the bottom wall of a housing to suppress the intrusion of moisture content into the gap between the rotation shaft of a control valve and a bearing. Both of the end parts of this water collection groove are inclined such that the center part of the housing bottom wall becomes low, and the water collection groove extends over the entire length of the housing in an intake air flow direction.

However, in the above water discharge structure, even when the valve is closed, a gap appears between the control valve and the housing bottom wall caused by the water collection groove, and gas flow (for example, tumble flow and swirl flow) becomes low due to air leak from this gap.

PRIOR ART REFERENCE

Patent Document

Patent Document 1: Japanese Patent Application Publication 2008-248861

SUMMARY OF THE INVENTION

An air intake device for an internal combustion engine of the present invention in which a control valve opening and closing a part of a passage cross section of an air intake passage is disposed on an upstream side from an air intake port formed in a cylinder head includes a cylindrical insert provided in the air intake port. A space is defined between an inner wall surface of the air intake port and the insert, and a water discharge passage is formed extending from a bottom surface of the air intake passage at which the control valve is positioned to the space.

In this structure, the main flow of intake air flows through the inside of the insert, and moisture content which drips down to the bottom surface of the intake air passage flows to the air intake port side through the water discharge passage.

According to the present invention, since the water discharge passage is formed independently from the passage inside the insert through which the main flow of the intake air flows, the flow of the intake air is not obstructed at the time of valve closing, and consequently, the lowering of the gas flow can be suppressed.

MODE FOR IMPLEMENTING THE INVENTION

In the following, an embodiment of the present invention will be explained with reference to the drawings.

Figure 1:
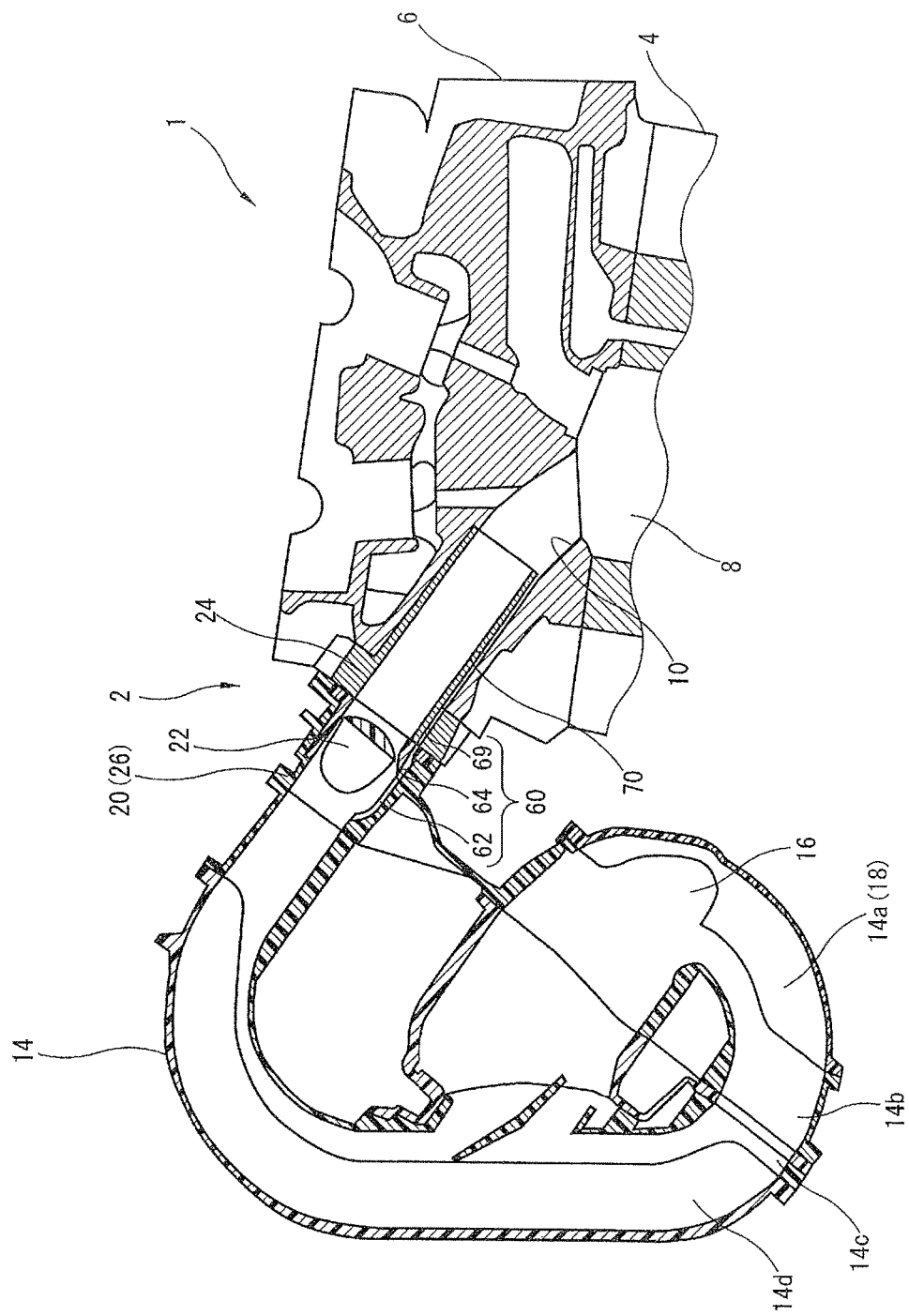
FIG. 1 is a sectional view of an air intake device of an embodiment.

FIG. 1 schematically shows an air intake device 2 for an internal combustion engine 1 according to the present invention. In the present embodiment, an example in which air intake device 2 of the present invention is applied to inline four cylinder internal combustion engine 1 is shown, and internal combustion engine 1 includes a cylinder block 4 and a cylinder head 6 disposed on cylinder block 4. Cylinder head 6 includes air intake ports 10 which introduce intake air to combustion chambers 8. Air intake ports 10 are provided to respective cylinders, and the downstream side part of each of intake ports 10 which is close to each of combustion chambers 8 is branched into two.

An intake manifold 4 attached to cylinder head 6 is formed by joining four members 14a to 14d made of hard synthetic resin to each other by vibration welding. Intake manifold 4 includes a collector 16 into which intake air is introduced via an intake port which is not shown in the drawings and four branch passages 18 as intake air passages which distribute the intake air in collector 16 to the cylinders. In addition, although FIG. 1 shows a position of intake manifold 4 in a state of being mounted on a vehicle, the position of intake manifold 14 is not limited to the position shown in the drawings.

Air intake device 2 of the present embodiment includes a control valve housing 20 which forms a part of intake manifold 14, control valves 22 which are swingably supported on control valve housing 20, and an insert 24 which is inserted into air intake ports 10.

Figure 2:
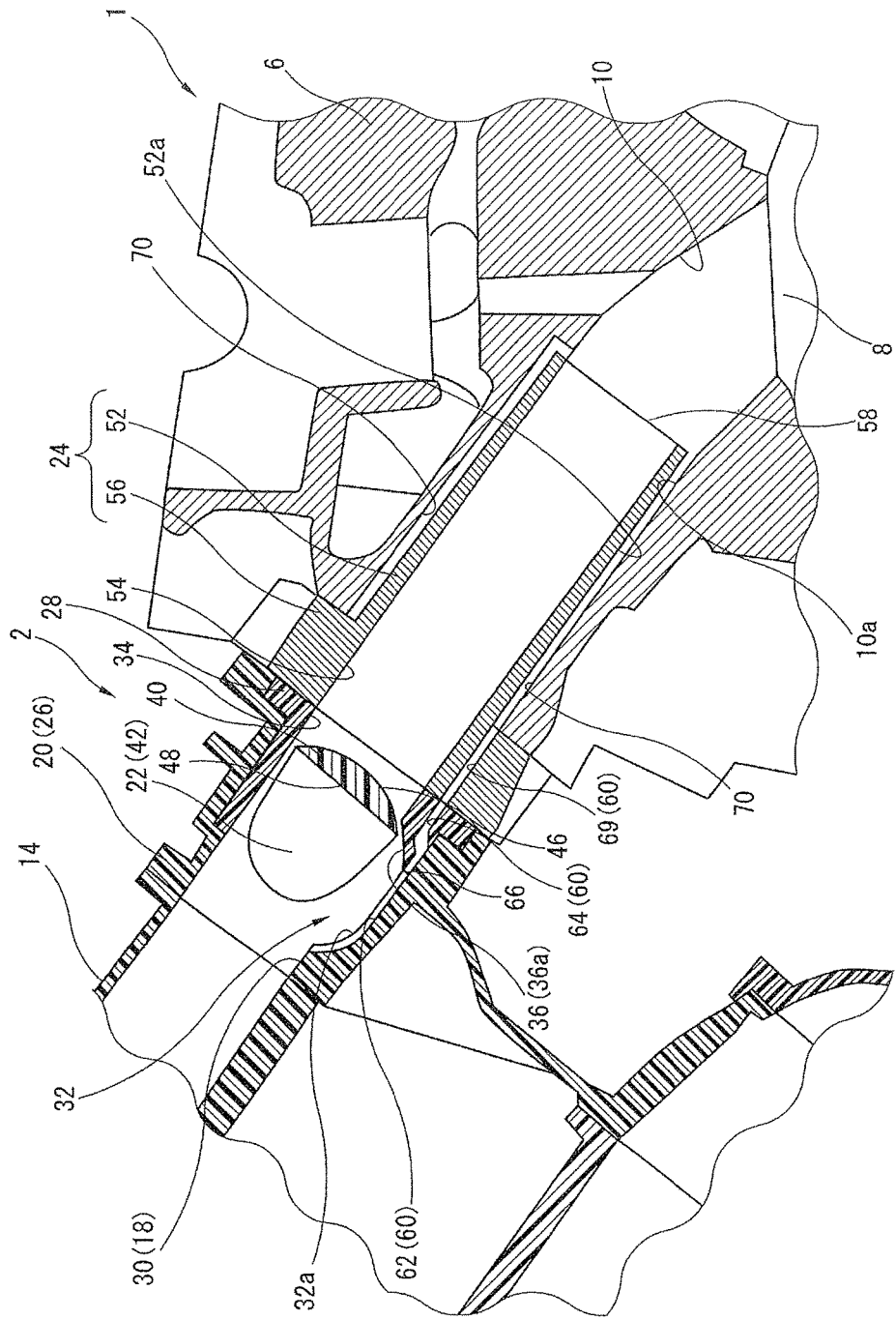
FIG. 2 is an enlarged sectional view of the air intake device which shows a control valve at the time of valve closing.
Figure 3:
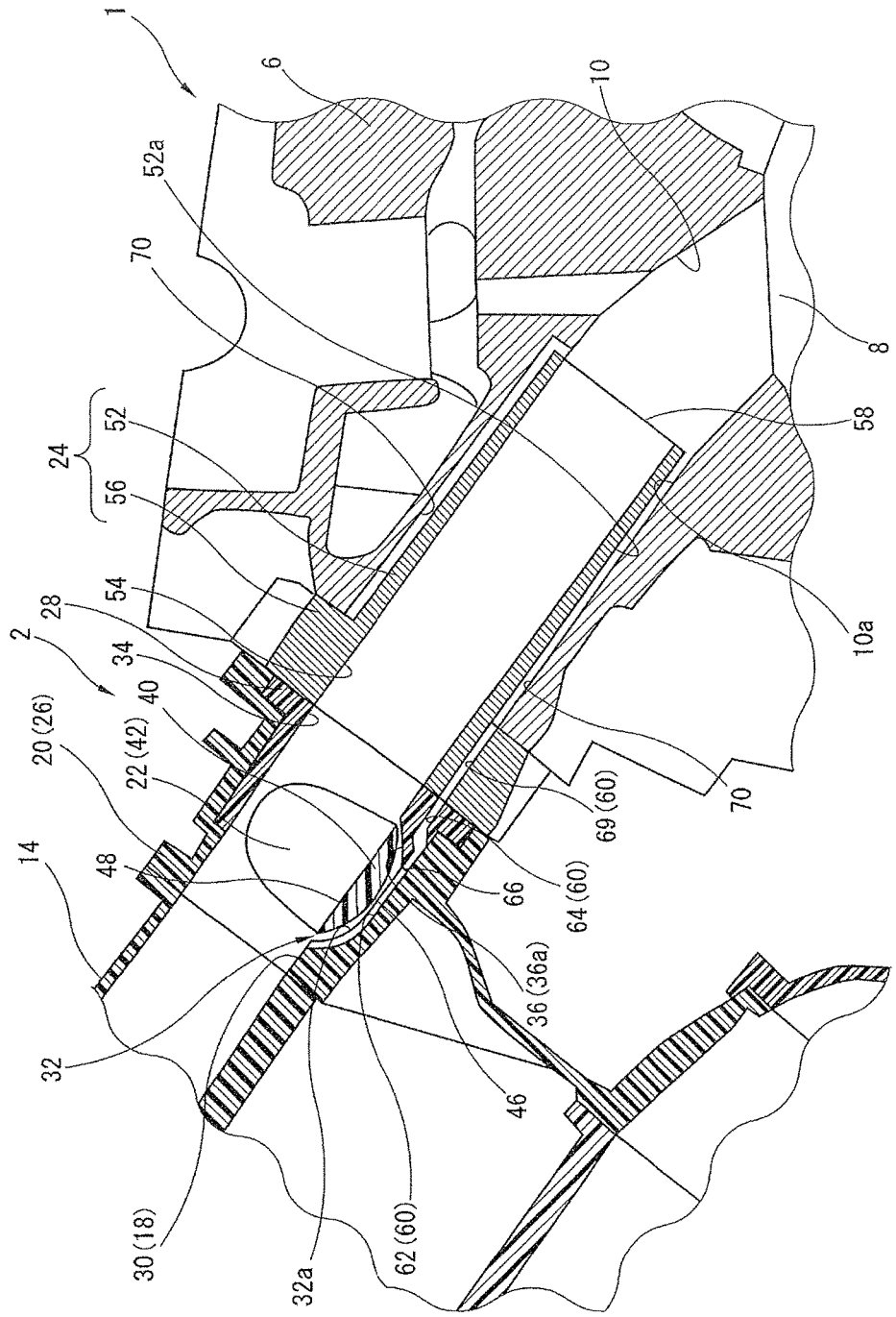
FIG. 3 is an enlarged sectional view of the air intake device which shows the control valve at the time of valve opening.

As shown in FIG. 2 and FIG. 3, control valve housing 20 is formed of a housing main body 26 which is formed integrally with second member 14b of air intake manifold 14 and which is formed in a long and narrow box shape in the longitudinal direction of the engine, and of a long and narrow housing cover 28 fit to the end surface (join surface with cylinder head 6) of this housing main body 26.

Housing main body 26 is formed with four housing passages 30 extending therethrough, each of which forms a part of each of branch passages 18. These four housing passages 30 are arranged in a line in the longitudinal direction of housing main body 26, and each of them is formed in a substantially rectangular shape in cross section (see FIG. 4). Each housing part 32 which houses a corresponding one of control valves 22 at the time of valve opening is recessed in a corresponding one of the bottom surfaces of housing passages 30. A bottom surface 32a of each of housing parts 32 is formed in a circular-arc shape with a corresponding one of the rotation centers of control valves 22 as a center.

Figure 5:
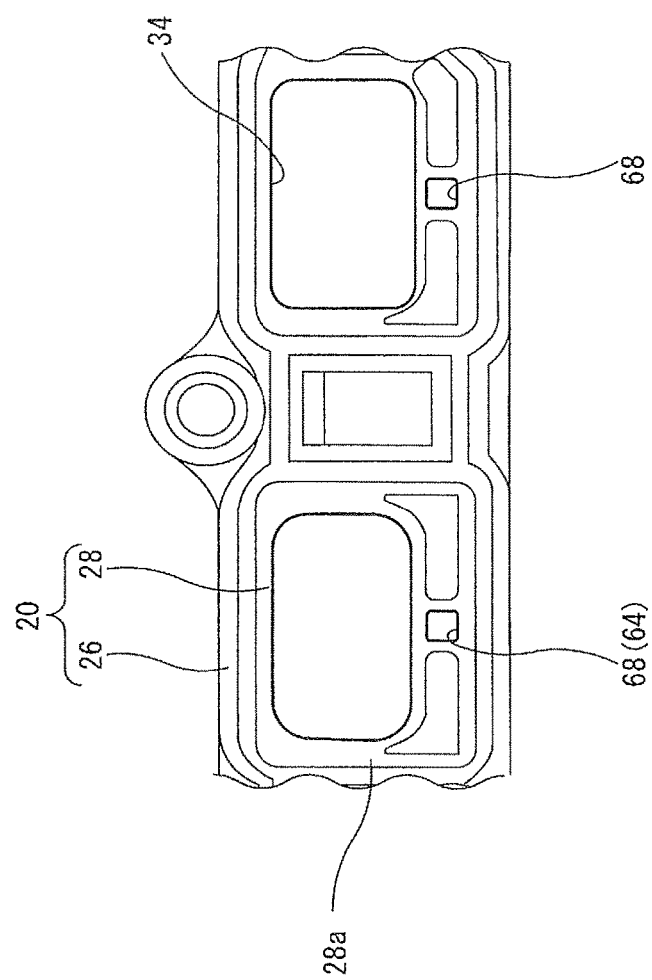
FIG. 5 is a drawing showing a downstream side end surface of a housing cover.

Housing cover 28 is made of a hard synthetic resin material, and four substantially rectangular opening parts 34 which correspond to the respective opening ends of housing passages 30 are opened and formed on housing cover 28 so as to be arranged in a line in the longitudinal direction (see FIG. 5). As shown in FIG. 2 and FIG. 3, the upstream side surface of housing cover 28 is formed with a projecting portion 36 projecting in a tongue shape from the lower end portion of each of opening parts 34. Respective projecting portions 36 include inner wall surfaces 36a curved in circular-arc shapes, and each of these inner wall surfaces 36a forms a part of each of bottom surfaces 32a of the housing parts 32.

Figure 4:
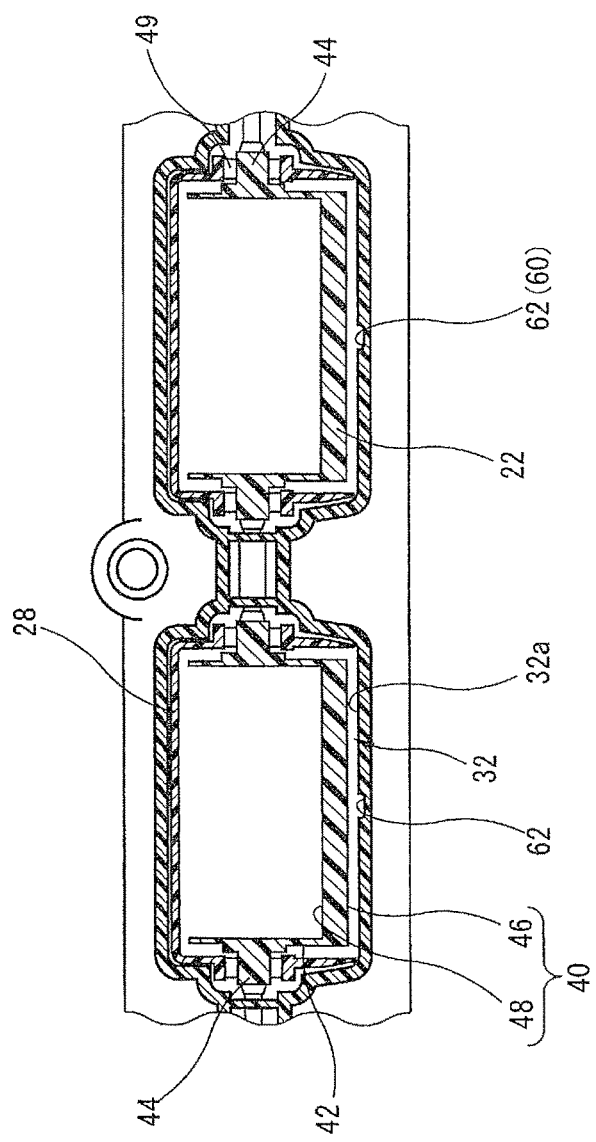
FIG. 4 is a drawing showing an upstream side end surface of a housing.

As shown in FIG. 4, each of control valves 22 is formed of a substantially rectangular valve part 40, side wall parts 42 provided on both sides of each of valve parts 40 and rotation shafts 44 provided to respective side wall parts 42, and they are formed integrally with each other and made of hard synthetic resin material. In the present embodiment, four valve parts 40 are connected with each other via rotation shafts 44.

As shown in FIG. 2 and FIG. 3, each of valve parts 40 is offset radially outward from a corresponding one of the centers of the rotation shafts 44. An outer side surface 46 of each of valve parts 40 having a thick plate shape is formed in a circular-arc shape with a corresponding one of rotation shafts 44 as a center. On the other hand, an inner side surface 48 of each of valve parts 40 is formed in a flat plate surface along the string of the circular arc. In addition, a ventilation window portion which is not shown in the drawings is cut out in a substantially rectangular shape and formed on the middle part of one long side part (long side part positioned on a downstream side at the time of the valve opening) of each of valve parts 40.

Control valves 22 are inserted into housing main body 26 such that each of valve parts 40 is positioned inside a corresponding one of housing passages 30, and housing cover 28 is attached so as to cover control valves 22. In the valve opening state shown in FIG. 3, each of valve parts 40 is housed in a corresponding one of housing parts 32, and each of outer side surfaces 46 of valve parts 40 faces a corresponding one of bottom surfaces 32a of housing parts 32. That is, each of bottom surfaces 32a is formed in a circular-arc shape along a corresponding one of turning orbits of outer side surfaces 46, and both of them are concentrically positioned. In addition, each of rotation shafts 44 is rotatably supported on a corresponding one of bearings 49, each of which is formed of housing main body 26 and housing cover 28.

Figure 6:
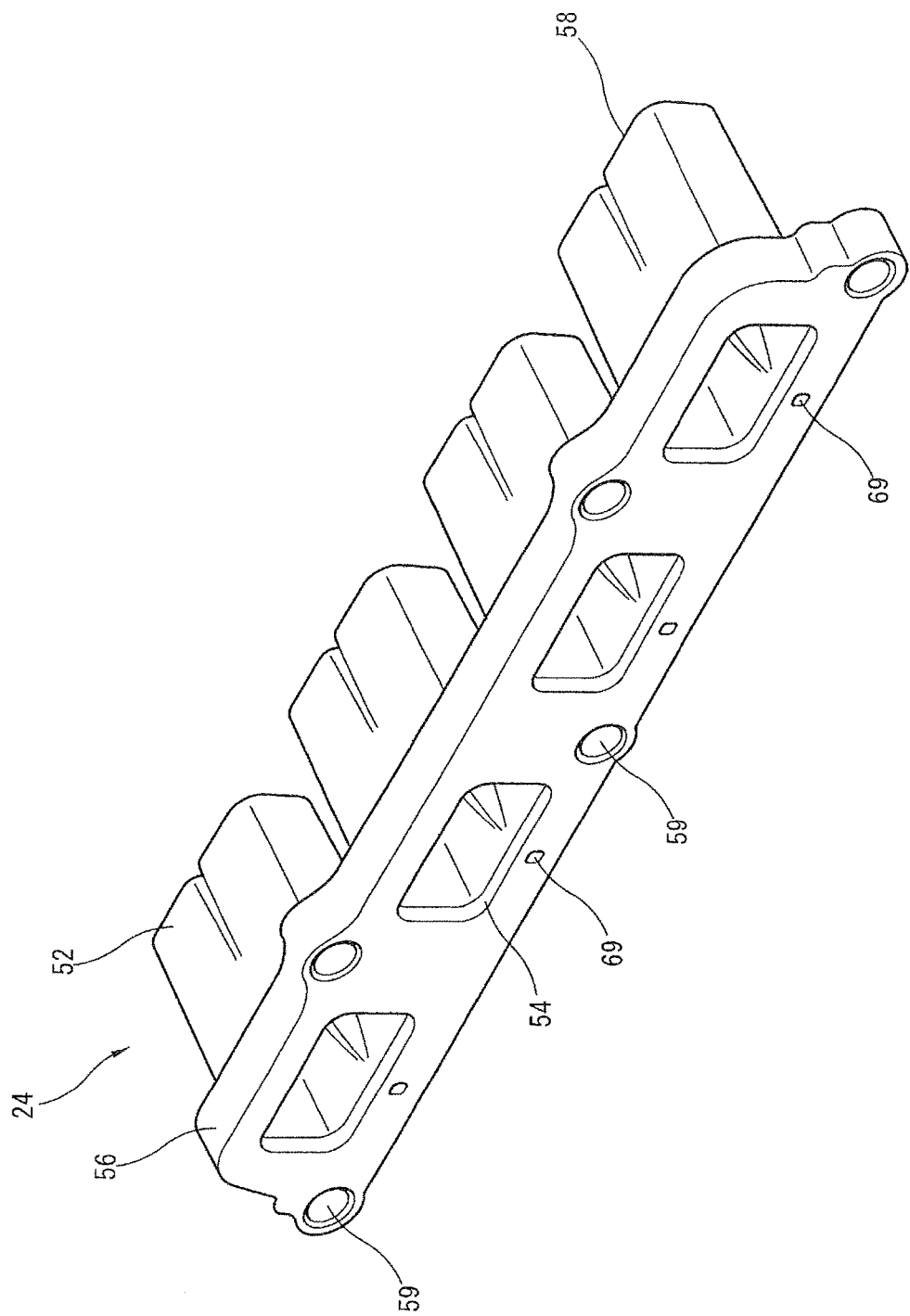
FIG. 6 is a perspective view of an insert.

As shown in FIG. 6, insert 24 which functions as a heat insulating port is made of a hard synthetic resin material, and includes four cylindrical parts 52 inserted into respective air intake ports 10 and a flange part 56 having a plate shape which is provided around upstream side opening ends 54 of respective cylindrical parts 52.

Each of cylindrical parts 52 is formed in a cylindrical shape having a rectangular shape in cross section so as to guide the main flow of the intake air through the inside thereof, and has a predetermined length such that a distal end portion 58 of each of cylindrical parts 52 is positioned at a position close to each of combustion chambers 8 (see FIG. 2). Flange part 56 is formed in a long and narrow plate shape extending in the engine longitudinal direction, and is provided with a plurality of bolt through holes 59 through which bolts (not shown in the drawings) used for attaching air intake manifold 14 to cylinder head 6 penetrate. Each of upstream side opening ends 54 penetrating flange part 56 is formed in a substantially rectangular shape, and four upstream side opening ends 54 are arranged in a line in the longitudinal direction so as to correspond to respective opening parts 34 of housing cover 28.

In insert 24 formed as above, cylindrical parts 52 are inserted into respective air intake ports 10, and flange part 56 is attached to be sandwiched between control valve housing 20 (air intake manifold 14) and cylinder head 6.

FIG. 2 shows the valve closing position of each of control valves 22. In the valve closing position, each of valve parts 40 is turned from a corresponding one of housing parts 32, and then closes a corresponding one of housing passages 30. Consequently, the intake air introduced into housing passages 30 flows to air intake ports 10 via the ventilation window portions which are not shown in the drawings. With this, tumble flow is strengthened.

On the other hand, in the valve opening position shown in FIG. 3, each of valve parts 40 is positioned along a corresponding one of bottom surfaces 32a of housing parts 32, and housing passages 30 are opened. At this time, an inner side surface 48 of each of valve parts 40 becomes a surface continuing to a corresponding one of the bottom walls of housing passages 30, and it forms a part of each of housing passages 30. The intake air introduced into housing passages 30 flows on the whole surface of each of opening sections 34, and tumble flow is weakened. In other words, in the valve opening position of FIG. 3, the whole of each of valve parts 40 becomes in a state of being housed in a corresponding one of housing parts 32 recessed in circular-arc shapes.

Next, a water discharge structure that is the main part of the present invention will be explained with reference to FIG. 2 to FIG. 6.

In, the present embodiment, water discharge passages 60 extending from respective bottom surfaces 32a of housing parts 32 to respective air intake ports 10 are included.

Specifically, as show in FIG. 2 and FIG. 4, a water collection groove 62 forming the upstream part of each of water discharge passages 60 is recessed in the middle in the width direction (axial direction of rotation shaft 44) of each of bottom surfaces 32a of housing parts 32. Each of water collection grooves 62 is formed in a substantially rectangular shape in cross section, has a predetermined depth such that moisture content that drips down to bottom surfaces 32a can be collected, and extends linearly along a corresponding one of the longitudinal directions of housing passages 30.

Moreover, as shown in FIG. 2 and FIG. 5, water discharge holes 64, each of which forms a part of each of water discharge passages 60, are formed through housing cover 28 so as to continue to respective water collection grooves 62. Each of water discharge holes 64 extends from a corresponding one of the upstream side end portions of projecting portions 36 to a downstream side end surface 28a of housing cover 28. Upstream side opening parts 66 of water discharge holes 64 are each positioned at the middle position in the width direction of each of projecting portions 36 so as to correspond to a corresponding one of downstream side end portions of water collection grooves 62. In addition, as shown in FIG. 5, in downstream side end surface 28a of housing cover 28, downstream side opening parts 68 of water discharge holes 64 are each opened at a lower side position in the middle in the width direction of each of opening parts 34. That is, each of water discharge holes 64 is formed independently from a corresponding one of opening parts 34 each forming a part of each of the air intake passages. Upstream side opening parts 66 and downstream side opening parts 68 are each formed in a substantially rectangular shape in cross section.

In addition, as shown in FIG. 2 and FIG. 6, flange part 56 of insert 24 is formed with water discharge holes 69 extending therethrough which form the respective downstream parts of water discharge passages 60 so as to continue to respective water discharge holes 64. Each of water discharge holes 69 extends linearly along the direction orthogonal to the surface of flange part 56. Each of water discharge holes 69 is formed in a substantially rectangular shape in cross section, and in the end surface on the upstream side of flange part 56, water discharge holes 69 are opened on the lower sides in the middle positions in the width directions of upstream side opening ends 54. That is, water discharge holes 69 are formed independently from upstream side opening ends 54 each forming a part of each of the air intake passages. In addition, in the end surface on the downstream side of flange part 56, water discharge holes 69 are opened at positions on the outer sides of cylindrical parts 52 and adjacent to cylindrical parts 52.

In a state in which insert 24 is inserted into air intake ports 10, small gaps, namely, small spaces 70 are defined between corresponding ones of inner wall surfaces 10a of air intake ports 10 and corresponding ones of outer wall surfaces 52a of cylindrical parts 52 on the whole outsides of cylindrical parts 52. The downstream ends of water discharge holes 69 penetrating flange part 56 of insert 24 communicate to respective spaces 70 formed between inner wall surfaces 10 of air intake ports 10 and cylindrical parts 52.

Moisture content in the intake air flowing through branch passages 18 drips clown to bottom surfaces 32a of housing parts 32 and collects inside collection grooves 62. This moisture content flows from water collection grooves 62 to spaces 70 defined between inner wall surfaces 10a of air intake ports 10 and cylindrical parts 52 through water discharge holes 64 and 69, and then flows to air intake ports 10. After that, the moisture content is finally sucked into combustion chambers 8 together with the main flow of intake air flowing through cylindrical parts 52.

In this way, the main flow of the intake air flows from housing passages 30 to the insides of cylindrical parts 52. However, the moisture content is discharged to the outsides of cylindrical parts 52 by flowing through water discharge passages 60 formed independently. Consequently, in the valve closing positon shown in FIG. 2, even if a part of the intake air flows inside water discharge passages 60, since water discharge passages 60 are formed independently from corresponding ones of cylindrical parts 52 through which the main flow of the intake air flows, the gas flow formed by the main flow of the intake air is not obstructed, and thereby the lowering of the gas flow can be suppressed. In particular, even if a part of the intake air flows the insides of discharge passages 60, since the intake air is diffused inside spaces 70 formed on the outer sides of cylindrical parts 52, the gas flow formed by the main flow of the intake air is not obstructed even if the part of the intake air merges with the main flow of the intake air flowing the inside of the insert.

As the above, although an embodiment of the present invention has been explained, the present invention is not limited to the above embodiment, and various modification can be possible.

In the present embodiment, although housing main body 26 is formed integrally with second member 14a of intake manifold 14, it can be formed integrally with intake manifold 14, or a different control valve housing may be attached to intake manifold 14.

In addition, in the present embodiment, for convenience of forming, although each of housing parts 32 is formed by dividing it into two members of housing main body 26 and a corresponding one of projecting portions 36 of housing cover 28, it is optional how to form housing parts 32.

Moreover, in the present invention, although control valves 22 in which valve parts 40 including respective arc-shaped outer side surfaces 46 are offset radially outward from corresponding ones of the centers of the rotation shafts 44 are used, the present invention is not limited to this, and, for example, butterfly type control valves may be used. Further, each of spaces 70 provided between a corresponding one of inner wall surfaces 10a of air intake ports 10 and a corresponding one of cylindrical parts 52 may be provided on a corresponding one of the whole outer sides of cylindrical parts 52, or may be provided on a part of each of the outer sides of cylindrical parts 52. That is, the passage sectional area of each of spaces 70 is formed larger than that of each of water discharge passages 60 such that the intake air after flowing through water discharge passages 60 is diffused in spaces 70. In addition, if water discharge passages 60 and spaces 70 can discharge water, their sizes are not limited.

The invention claimed is:

1. An air intake device for an internal combustion engine in which a control valve opening and closing a part of a passage cross section of an air intake passage is disposed on an upstream side from an air intake port formed in a cylinder head, comprising:
    an insert configured to guide a main flow of intake air into the air intake port, the main flow of the intake air which has passed through the control valve, wherein the insert includes:
        a cylindrical part having a cylindrical shape which is inserted into the air intake port; and
        a flange part which is provided around an upstream side opening end of the cylindrical part and which is sandwiched between a control valve housing which houses the control valve and the cylinder head,
    a space defined between an inner wall surface of the air intake port and an outer wall surface of the cylindrical part on a whole outside of the cylindrical part; and
    a water discharge passage formed extending from a bottom surface of the air intake passage at which the control valve is positioned to the space, wherein the water discharge passage penetrates the flange part.

2. The air intake device for the internal combustion engine according to claim 1, wherein the control valve is provided with a valve part which turns at a position offset radially outward from a center of a rotation shaft,
    wherein the valve part includes an outer side surface formed in a circular-arc shape along a turning orbit around the rotation shaft as a center, and
    wherein the bottom surface of the air intake passage is formed with a housing part recessed in a circular-arc shape which houses the valve part, and an upstream end of the water discharge passage is opened in a bottom portion of the housing part.

3. The air intake device for the internal combustion engine according to claim 2, wherein the bottom portion of the housing part is formed with a water collection groove recessed therein, the water collection groove which forms a part of the water discharge passage.

4. The air intake device for the internal combustion engine according to claim 3, wherein the water discharge passage is opened independently from an opening part of the air intake passage in an end surface of the control valve housing.

* * * * *